(12) United States Patent
Lim et al.

(10) Patent No.: US 9,164,904 B2
(45) Date of Patent: Oct. 20, 2015

(54) ACCESSING REMOTE MEMORY ON A MEMORY BLADE

(75) Inventors: Kevin T. Lim, La Honda, CA (US); Naveen Muralimanohar, Santa Clara, CA (US); Norman Paul Jouppi, Palo Alto, CA (US); Robert Schreiber, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 389 days.

(21) Appl. No.: 13/596,331

(22) Filed: Aug. 28, 2012

(65) Prior Publication Data

US 2014/0068209 A1    Mar. 6, 2014

(51) Int. Cl.
*G06F 12/00* (2006.01)
*G06F 12/08* (2006.01)

(52) U.S. Cl.
CPC .......... *G06F 12/08* (2013.01); *G06F 2212/254* (2013.01); *Y02B 60/1225* (2013.01)

(58) Field of Classification Search
CPC ... G06F 3/0605; G06F 3/0659; G06F 3/0613; G06F 3/689
USPC ........................................................ 711/154
See application file for complete search history.

(56) References Cited

U.S. PATENT DOCUMENTS

| | | | |
|---|---|---|---|
| 6,574,698 B1 * | 6/2003 | Dhong et al. ...................... 711/3 |
| 6,766,424 B1 * | 7/2004 | Wilson ............................ 711/148 |
| 6,782,453 B2 | 8/2004 | Keltcher et al. |
| 8,131,814 B1 | 3/2012 | Schlansker et al. |
| 8,566,549 B1 * | 10/2013 | Burke et al. ................... 711/168 |
| 2009/0089537 A1 * | 4/2009 | Vick et al. ..................... 711/203 |
| 2010/0332720 A1 * | 12/2010 | Chang et al. ..................... 711/6 |
| 2011/0047317 A1 * | 2/2011 | Burkard et al. ............... 711/103 |
| 2011/0072234 A1 | 3/2011 | Chinya et al. |
| 2011/0093646 A1 * | 4/2011 | Koka et al. ..................... 711/103 |
| 2011/0138102 A1 * | 6/2011 | Glikson et al. ..................... 711/6 |
| 2011/0167196 A1 * | 7/2011 | Scales et al. ...................... 711/6 |
| 2012/0042119 A1 * | 2/2012 | Suzuki ........................... 711/103 |
| 2012/0102273 A1 * | 4/2012 | Chang et al. .................. 711/143 |
| 2012/0110108 A1 * | 5/2012 | Li et al. .......................... 709/213 |
| 2013/0086132 A1 * | 4/2013 | Hunt et al. .................... 707/819 |
| 2014/0047193 A1 * | 2/2014 | Gross et al. ................... 711/144 |

\* cited by examiner

*Primary Examiner* — Charles Rones
*Assistant Examiner* — Nanci Wong
(74) *Attorney, Agent, or Firm* — Van Colt, Bagley, Cornwall & McCarthy

(57) ABSTRACT

A method of accessing remote memory comprising receiving a request for access to a page from a computing device, adding an address of the accessed page to a recent list memory on the remote memory, associating a recent list group identifier to a number of addresses of accessed pages, transferring the requested page to the computing device with the recent list group identifier and temporarily maintaining a copy of the transferred page on the remote memory.

5 Claims, 5 Drawing Sheets

ACCESSING REMOTE MEMORY ON A MEMORY BLADE

BACKGROUND

Various local memory devices may be augmented with additional remote memory storage through the use of a commodity link such as a peripheral component interconnect express (PCIe). This disaggregated memory system may provide a remote, shared capacity to compute blades through the use of a physically separate memory blade. Often, these systems use an exclusive organization where the data in a local memory is not copied on any remote memory. This organization may result in situations where data is brought in from remote memory, is unaltered while stored in local memory, and is subsequently copied back to remote memory. The swapping of these pages of data may increase, unnecessarily, the bandwidth utilization in the system over the PCIe. Although a PCIe may provide up to several gigabytes per second of bandwidth, this may not be a sufficient amount to exchange the data from the local memory device to the remote one. Slower possessing may then result in slower response times in a computing system leading to customer dissatisfaction.

BRIEF DESCRIPTION OF THE DRAWINGS

The accompanying drawings illustrate various examples of the principles described herein and are a part of the specification. The examples do not limit the scope of the claims.

Throughout the drawings, identical reference numbers designate similar, but not necessarily identical, elements.

DETAILED DESCRIPTION

Figure 1:
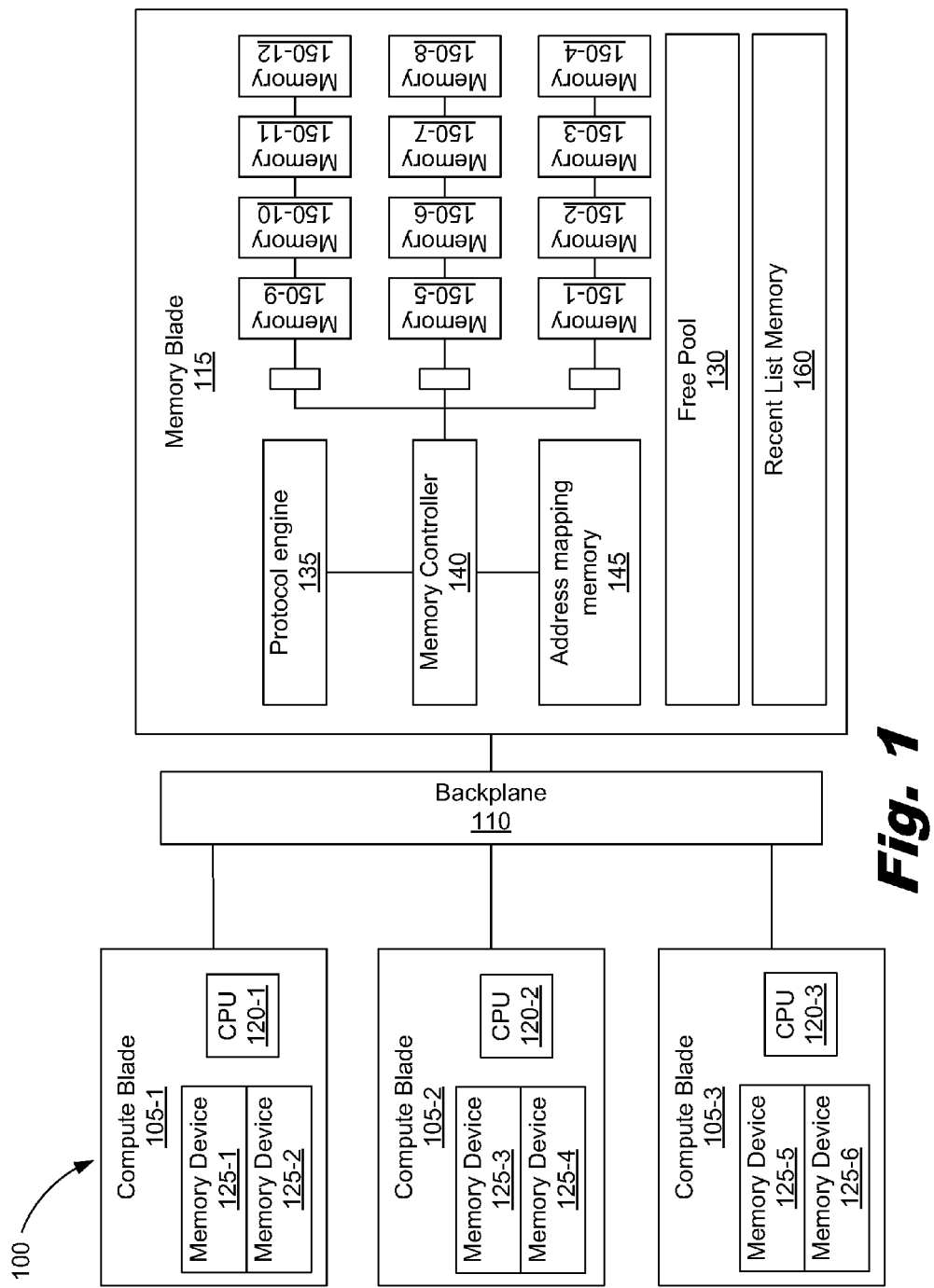
FIG. 1 is a block diagram showing the memory architecture within a computing device according to one example of the principles described herein.

As discussed above, memory blade designs allow for a user or system administrator to increase the amount of remote memory storage to augment the local memory of a compute blade. Some memory blade designs use a layer in a hypervisor to allow a user to connect an amount of remote memory to the existing local memory. The remote memory may then appear to the computer system to be part of the existing local memory thereby creating a transparent expansion of the capacity of the compute blade. Although this may provide the computing system on which the compute blade resides a unified view of a relatively larger amount of memory available to the system, the hypervisor used must first detect accesses to the remote memory and intervene in the process. Specifically, the hypervisor swaps pages of memory from the remote to the local memory. If the local memory is full, a local page is swapped to the remote memory in order to place the page therein.

As a result of this design and with the use of a commodity link such as a PCIe, bandwidth to the remote memory can become a relatively contended resource. This becomes especially true where multiple cores within a computer system are given access to the remote memory blade. Consequently, bandwidth is consumed for instances where pages of data are both brought in and evicted out of the local memory. Often, remote memory is exclusive of local memory such that the data stored in local memory is not duplicated in the remote memory. In an exclusive cache organization, any pages that are brought from remote memory to the local memory and then evicted from the local memory must then be written back. This is true in every case even if the page of data was not altered while in the local memory. The system, therefore, may often write back information to the remote memory that is identical to the data that was originally read. This process consumes unnecessary extra bandwidth over the backplane.

Additionally, because of the substantial size of the local memory (i.e. 10's of gigabytes), it may be inefficient to maintain an inclusive cache organization such that the data found on the local memory is duplicated on the remote memory. Indeed, any changes made in the local memory would have to be duplicated in remote memory. The duplication processes may also cause unnecessary extra bandwidth over the backplane.

The present specification therefore describes a method of accessing remote memory comprising, receiving a request for access to a page from a computing device, adding an address of the accessed page to a recent list memory on the remote memory, associating a recent list group identifier to a number of addresses of accessed pages, transferring the requested page to the computing device with the recent list group identifier and temporarily maintaining a copy of the transferred page on the remote memory.

The present specification also describes a computing device comprising a compute blade maintaining local memory, a memory blade maintaining remote memory and communicatively coupled to the compute blade, a processor to request, transfer, and evict pages of memory to and from the local and remote memory, and a recent list memory to store a number of addresses associated with pages of data requested by the compute blade.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language indicates that a particular feature, structure, or characteristic described in connection with that example is included as described, but may not be included in other examples.

In the present specification and in the appended claims the term "local memory" is meant to be understood broadly as any memory communicatively coupled to a compute blade and accessed by the compute blade without sending access or write requests over a backplane using a commodity link to a memory blade. The local memory may include pages of data called local pages.

Conversely, in the present specification and in the appended claims the term "remote memory" is meant to be understood broadly as any memory communicatively coupled to a compute blade and accessed by the compute blade through sending access or write requests over a backplane using a commodity link. Remote memory may include pages of data called remote pages. The remote pages may be transferred to the local memory using the commodity link and become local pages of data. A number of types of remote memory devices may be used in the described system and method including, but not limited to, a blade, a board, a cartridge, or a module.

Additionally, in the present specification and in the appended claims, the terms "free" or "freed" when used in connection with data blocks or pages of data within a memory device is meant to be understood broadly as any number of data blocks which have undergone a process under which they were changed from once inaccessible to now being accessible for reading and writing.

FIG. 1 is a block diagram showing the blade architecture (100) within a computing device according to one example of the principles described herein. The architecture may comprise a number of compute blades (105-1, 105-2, 105-3), a backplane (110), and a memory blade (115). Each of these will now be described in more detail. Additionally, although FIG. 1 shows three compute blades (105-1, 105-2, 105-3), a single backplane (110), and a single memory blade (115), FIG. 1 is merely an example. Therefore, any number of these devices may be used without diverging from the principles described in connection with the present application.

The number of compute blades (105-1, 105-2, 105-3) may each comprise a central processing unit (CPU) (120-1, 120-2, 120-3) and a number of memory devices (125-1, 125-2, 125-3, 125-4, 125-5, 125-6). Each CPU (120-1, 120-2, 120-3) may receive computer program code stored on the memory devices (125-1-125-6) and execute that code such that pages of data may be written to or read from the memory blade (115). Additionally, as will be explained in more detail, the CPU (120-1, 120-2, 120-3) may further receive computer program code stored on the memory devices (125-1-125-6) and execute that code such that the CPU makes a determination as to whether an evicted page of data has been altered while in the local memory, and if not, can direct the page to not be written again and instead inform the memory blade (115) of the identity of the page. The CPU (120-1, 120-2, 120-3) may also cause a page of data located on the memory blade (115) to be temporarily buffered thereby providing the remote memory in the memory blade (115) temporary inclusivity of the page being moved to the local memory on one of the number of compute blades (105-1, 105-2, 105-3). Therefore, instead of immediately replacing the remote page with the content of a local page, the incoming data is instead written to a page in a separately managed pool within a free pool (130).

The number of memory devices (125-1-125-6) may store data such as executable code. This executable code is processed and produced by the number of CPUs (120-1, 120-2, 120-3). The memory devices (125-1-125-6) may include various types of memory devices, including volatile and nonvolatile memory. For example, the memory devices (125-1-125-6) of the present example may include Random Access Memory (RAM), Read Only Memory (ROM), and Hard Disk Drive (HDD) memory, among others. The present specification contemplates the use of many varying type(s) of memory in the memory devices (125-1-125-6) as may suit a particular application of the principles described herein. In certain examples, different types of memory in the memory devices (125-1-125-6) may be used for different data storage needs. In certain examples, the CPUs (120-1, 120-2, 120-3) may boot from Read Only Memory (ROM), maintain nonvolatile storage in Hard Disk Drive (HDD) memory, and execute program code stored in Random Access Memory (RAM).

Generally, the memory devices (125-1-125-6) may comprise a computer readable storage medium. For example, the memory devices (125-1-125-6) may be, but not limited to, an electronic, magnetic, optical, electromagnetic, infrared, or semiconductor system, apparatus, or device, or any suitable combination of the foregoing. More specific examples of the computer readable storage medium may include, for example, the following: a portable computer diskette, a hard disk, a random access memory (RAM), a read-only memory (ROM), an erasable programmable read-only memory (EPROM), flash memory, byte-addressable non-volatile memory (phase change memory, memristors), a portable compact disc read-only memory (CD-ROM), an optical storage device, a magnetic storage device, or any suitable combination of the foregoing, among others. In the context of this document, a computer readable storage medium may be any tangible medium that can contain, or store a program for use by or in connection with an instruction execution system, apparatus, or device.

The backplane (110) serves as a physical connection between the compute blades (105-1, 105-2, 105-3) and memory blade (115). As discussed above, a commodity link, such as a peripheral component interconnect express (PCIe), may be used as a motherboard-level interconnect, connecting the CPU (120-1, 120-2, 120-3) with both integrated-peripherals and add-on peripherals such as the memory blade (115).

The memory blade (115) may comprise a protocol engine (135), a memory controller (140), an address mapping memory (145), the free pool (130) as briefly mentioned above, and a number of memory devices (150-1-150-12). In one example, the memory blade (115) may be used by multiple compute blades (105-1, 105-2, 105-3) as indicated by FIG. 1. The capacity of the memory blade (115) may be either statically or dynamically partitioned across the number of compute blades (105-1, 105-2, 105-3).

The protocol engine (135) provides communication protocols via the interconnect over the backplane (110). The protocol engine (135) may be a dedicated processor used to provide, in the form of digital message formats and rules, messages in or between the devices of the computing device. Again, PCIe may be used as the communications protocol running on the protocol engine (135).

The memory controller (140) may handle all access requests originating from the number of compute blades (105-1, 105-2, 105-3). Once the access requests are received, the memory controller (140) may send those requests off to the proper memory device (150-1-150-12) located on the memory blade (115). The memory controller (140) may also be a dedicated processor capable of completing these tasks.

The address mapping memory (145) may be any type of memory capable of storing a range of discrete addresses, each of which may correspond to a network host, a peripheral device, a disk sector, a memory cell or other logical or physical entity within the computing device. The data stored on the address mapping memory (145) may be used by the memory controller (140) to locate a certain page or sections of data stored on the number of memory devices (150-1-150-12) within the memory blade (115).

The memory blade (115) may further comprise a free pool (130). As briefly discussed above the free pool (130) may be used to temporarily buffer a page or an amount of data before a decision is made whether to send the page of data off to any one of the number of memory devices (125-1, 125-2, 125-3, 125-4, 125-5, 125-6) located on the number of compute blades (105-1, 105-2, 105-3).

The memory blade (115) also may include a recent list memory (160). The recent list memory (160) may form part of the existing memory or may be a dedicated portion of memory located on the memory blade (115). In one example, the recent list memory (160) is used exclusively by the memory blade (115) and is made inaccessible to the number of compute blades (105-1, 105-2, 105-3). As will be discussed in more detail below, the recent list memory (160) may store the pointers to and addresses associated with a number of remote pages recently accessed by the number of compute blades (105-1, 105-2, 105-3).

Figure 2:
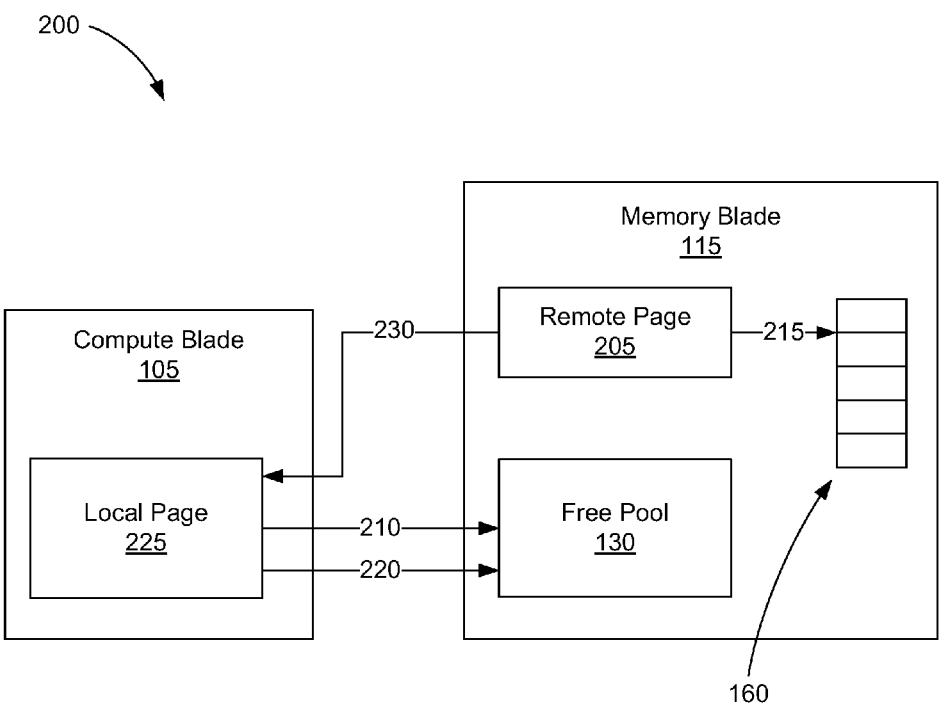
FIG. 2 is a block diagram showing the data exchange during a remote memory access procedure according to one example of the principles described herein.

Turning now to FIG. 2, a block diagram (200) showing the data exchange during a remote memory access procedure is shown according to one example of the principles described herein. The process of accessing a remote memory may start with one of a number of compute blades (105) detecting that a remote page (205) of memory located on the memory blade (115) is to be accessed. A request (210) for the remote page (205) is then sent to the memory blade (115). The memory blade (115) may then identify the address of the requested remote page (205) and add (215) the address associated with the requested page to the recent list memory (160). The recent list memory (160) is therefore a linked list that identifies all pages of data that are recently sent over to the local memory on the compute blade (105).

In addition, the pages of data associated with this list of addresses on the recent list memory (160) will be added periodically in bulk to the free pool (130) on, for example an on-demand basis. The free pool (130) may be used in situations where the compute blade (105) is evicting a page from its memory to make room for an incoming accessed page from the memory blade (115). In one example, if the free pool (130) reaches a threshold where a relatively small percentage of the memory defining the free pool (130) does not contain data, then some or all of the remote memory pages associated with the addresses in the recent list memory (160) will be added to the free pool (130). In another example, the free pool (130) may have the data associated with the addresses saved in the recent list memory (160) added to it after a predefined time period such as every 10 ms. Therefore, for the length of time between when the remote page (205) has been sent to local memory and when that page is sent back to the memory blade (115), the computing system may function as a temporarily inclusive memory system as to that page (205) of data.

Figure 3:
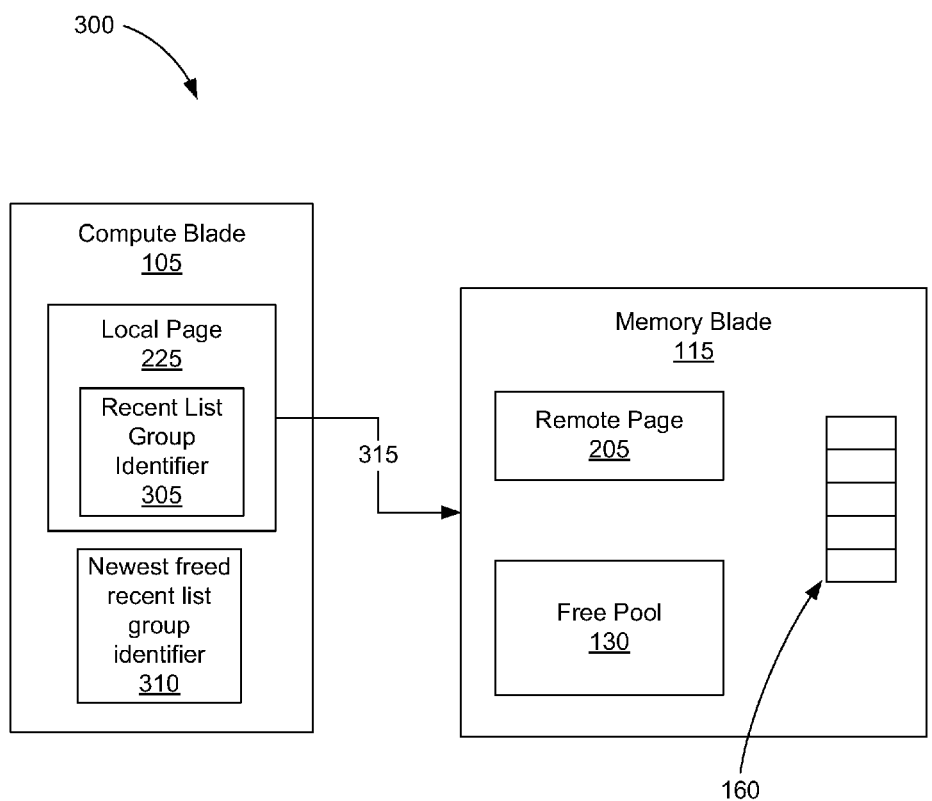
FIG. 3 is a block diagram showing the process of evicting local pages on the compute blade according to one example of the principles described herein.

Still further, in one example, each address stored on the recent list memory (160) may be associated with a corresponding recent list group identifier (FIG. 3, 305). As will be discussed later, this recent list group identifier (FIG. 3, 305) allows the computer system to decide whether or not a local page (225) on the compute blade (105) has a corresponding copy of the same page on the memory blade (115). In one example, a number of addresses stored on the recent list memory (160) may all have a recent list group identifier (FIG. 3, 305) associated with the group of addresses. In this example, the use of a single recent list group identifier with a number of addresses stored on the recent list memory (160) may allow multiple recent list group identifiers (FIG. 3, 305) to be stored on the recent list memory (160).

Therefore, in one example multiple recent list groups may be maintained on the recent list memory (160). This may enable specific amounts of pages to be freed from the recent list and placed in the free pool (130) regularly, as opposed to being dictated by the number of pages that have been recently transferred to the free pool (130) or the time that has elapsed from the last replenishing of the free pool (130). In this example, a monotonically increasing identification may be assigned with each recent list group. Thus, when pages are brought from remote memory on the memory blade (115) to local memory on the compute blade (105), the recent list group identifier (FIG. 3, 305) may also be transferred with the page. As the identification is likely small (i.e. 8 bits), this will be very low overhead in addition to the 4 KB page being transferred.

In one example, the addresses associated with any given recent list group identifier may be compiled over a set time period, such as every 30 seconds. In this example, all page accesses initiated by the compute blade (105), and thereby all addresses associated with those pages accessed, are saved in the recent list memory (160). The recent list group identifier (FIG. 3, 305) then will be associated with those page accesses in that time frame.

In another example, the number of addresses associated with the recent list group identifier may be set to a certain number. In this example, after a certain number of accesses have been reached, a recent list group identifier (FIG. 3, 305) is assigned to that group of pages.

After requesting (210) the remote page (205), the compute blade (105) may also evict a page from local memory and send (220) that page to the memory blade (115). In this example, the hypervisor may detect whether or not the page (225) being evicted has been modified since it was sent to local memory. If the page (225) has been modified, the page (225) is considered dirty, and in one example the entire page (225) is written back to the remote memory on the memory blade (115).

If it has not been modified, then the page (225) is considered clean and the hypervisor may avoid having to transfer the entire local page (225) to the remote memory on the memory blade (115). Instead, the hypervisor may simply provide the memory blade (115) with the identity of the evicted local page (225) using the above mentioned identifier. The memory blade (115) may then remove that page's address from the recent list memory and make it accessible within the remote memory again. This may be done without copying the page. By keeping the contents of a recently transferred page alive on the memory blade (115) for a temporary period of time, the system (100) may provide an opportunity to avoid having the entire content of the page transferred across the backplane upon eviction.

During this process, the memory blade (115) may also transfer (230) the requested remote page (205) to the compute blade (105) along with an identifier. In one example, the identifier for that remote memory-originating page (205) may be tracked as the page is moved from the memory blade (115) to the compute blade (105) and back again.

The amount of information associated with that identifier transferred with the page (205) may be significantly smaller that the entire page (205). Indeed, in one example, the identifier may be as small as a 64-bit address which is significantly smaller than, for example, a 4 KB page. In one example, the identifier may be the same identifier used to identify the page's group within the recent list memory (160).

In one example, any modifications of the original remote page (205) while it is saved on the compute blade (105) can be tracked using page modification metadata associated with the page. In this example, each block of data within a remote page (205) transferred to the compute blade (105) and saved as a local page (225) may be monitored. Each block that is deemed "dirty" or which has been altered by the compute blade (105) is tracked, and, upon eviction (220), will send the page modification metadata along with the dirty data blocks to the memory blade (115). It has been found that, on average, less than 5% of a page gets modified before getting replaced. In this case the write backs to the memory blade (115) may be significantly reduced as compared to sending the entire page with all data from the page (225) being written back.

Still further, in another example, any modifications of the original remote page (205) while it is saved on the compute blade (105) can be proactively made in the copy of the page located on the memory blade (115). In this way, a clean copy of the local page (225) on the compute blade (105) may also be present on the memory blade (115) when the compute blade (105) decides to evict the page back to the memory blade (115). As long as the copy of the local page (225) still exists on the memory blade (115) as indicated by the recent list memory (160), upon eviction, the compute blade (105) may send a signal indicating that the address of the copy of the local page (225) on the memory blade (115) is to be removed from the recent list memory.

Unlike an inclusive cache design, not every page in local memory on the compute blade (105) will have its contents also exist in remote memory on the memory blade (115). Also, unlike an inclusive design, the pages that exist on both remote and local memory are only truly active in one location. Therefore, the memory blade does not monitor updates to the remote page. However, as the pages will exist on a recent list for a temporary period of time, care is taken to coordinate the memory blade's (115) releasing of pages on the recent list to the free pool (130) as well as the notifications to the compute blade (105) that a page no longer exists on the recent list memory (160).

To this end, a commit phase may be organized where the memory blade (115) will first transmit the identification of the recent list group (160) when it is in the process of freeing it to the free pool (130). The memory blade (115) will select those pages associated with the oldest recent list group in the recent list memory (160). These pages are then transferred to the free pool (130). The compute blades (e.g., compute blade 105) may then receive and record this information when the memory blade (115) broadcasts this information to them. This broadcasted identifier may be called a newest freed recent list group identifier. This newest freed recent list group identifier allows the compute blade (105) to quickly check if a clean, formerly remote page can be evicted without completely being transferred over the backplane (110) and to the memory blade (115). FIG. 3 describes this process in more detail while further describing the eviction process of a local page (225).

FIG. 3 is a block diagram showing the process (300) of evicting local pages on the compute blade (105) according to one example of the principles described herein. As mentioned above, this process helps to detect when a page is clean and a temporary copy of it exists on the memory blade (115). The process (300) may also allow smaller portions of the page to be written back to the memory blade (115) rather than the entire page. This results in a saving of bandwidth and power consumption.

The decision of which local page (225) on the compute blade (105) to evict may be done via a number of methods. In one example, a least recently used replacement method may be implemented to choose which local page (225) is to be evicted. In this case, the page that was least recently accessed or altered by the compute blade (105) is chosen to be evicted. In another example, a round robin method may be used where the next address in a series of addresses is evicted whenever the local memory on the compute blade (105) needs more capacity. In another example, the most recently transferred page or a very recently transferred page is the next page to be evicted from the local memory. In this case, because the page was most recently transferred, then there is a higher likelihood that a copy of that page still exists temporarily on the memory blade (115). This will allow the page to be evicted with relatively low overhead.

The process (300) may begin with the compute blade (105) determining whether or not the page (225) to be evicted had originated from the remote memory on the memory blade (115). If the local page (225) did not originate from the remote memory on the memory blade (115), then there will not be a temporary copy of the page on the memory blade (115). If this is the case, then the page may be written to the memory blade (115) and the process may end. Conversely, if the local page (225) did originate from the remote memory on the memory blade (115), then there is still the possibility that a temporary copy of the page (225) is present.

The compute blade (105) may then check the recent list group identifier (305) that was transferred along with the page when the page was sent to the local memory on the compute blade (105). The compute blade (105) then determines if the page still exists on the memory blade (115) by checking the recent list group identifier (305) against the newest freed recent list group identifier (310) broadcasted by the memory blade (115). If the recent list group identifier (305) is newer than the newest freed recent list group identifier (310), then that page still exists on the memory blade (115). When this occurs, the compute blade (105) may signal (315) the memory blade (115) to free up the copy of the local page (225) stored on the memory blade (115) and re-add that page into the memory blade's (115) capacity.

The signal sent (315) to the memory blade (115) by the compute blade (105) may comprise the address of the local page (225) and the recent list group identifier (305). The receipt of the signal by the memory blade (115) causes the copy of the local page (225) to be released and its associated address removed from the recent list memory (160).

When the recent list group identifier (305) is newer than the newest freed recent list group identifier (310) broadcast by the memory blade, changes may still have been made to the local page (225) while it was on the compute blade (105). In this case, as described above, the signal sent (315) to the memory blade (115) to free up the copy of the local page (225) may further include page modification metadata indicating which portions of the data within the local page (225) had been changed since the page had been transferred to the compute blade (105). This page modification metadata may be encoded. In one example, the encoded data may comprise information regarding the changed blocks of data, concatenated consecutively, together with a bit vector having a length of (page_length)/(line_length), which equals the number of lines per page. Here, a "0" may indicate that the corresponding line was unaltered or "clean" while stored in the compute blade (105) while a "1" may indicate the line was altered. Alternatively, address and changed line pairs may be sent to the memory blade (115).

In this case, the memory blade (115) will receive this information, make the changes to the copy of the local page (225) as indicated by the signal, and make that page available again. In one example, a threshold may be set such that the signal to make the page available may or may not include the page modification metadata based on the number of changes made to the local page (225) while on the compute blade (105). For example, if 50% or more of the page had been changed since it was transferred to the compute blade (105), then the compute blade (105) may not send the page modification metadata along with the signal and instead send a copy of the local page (225) to the memory blade (115) as a complete replacement of the copy of the local page (225) stored on the memory blade (115). In one example, the threshold percentage may be any percentage. In another example, the threshold percentage may be user definable.

If the recent list group identifier (305) is older than or equal to the newest freed recent list group identifier (310) broadcast by the memory blade, then a temporary copy of the local page (225) no longer exists on the memory blade (115). When this happens the compute blade (105) will transfer the entirety of the local page (225) being evicted to the remote memory on the memory blade (115).

Figure 4:
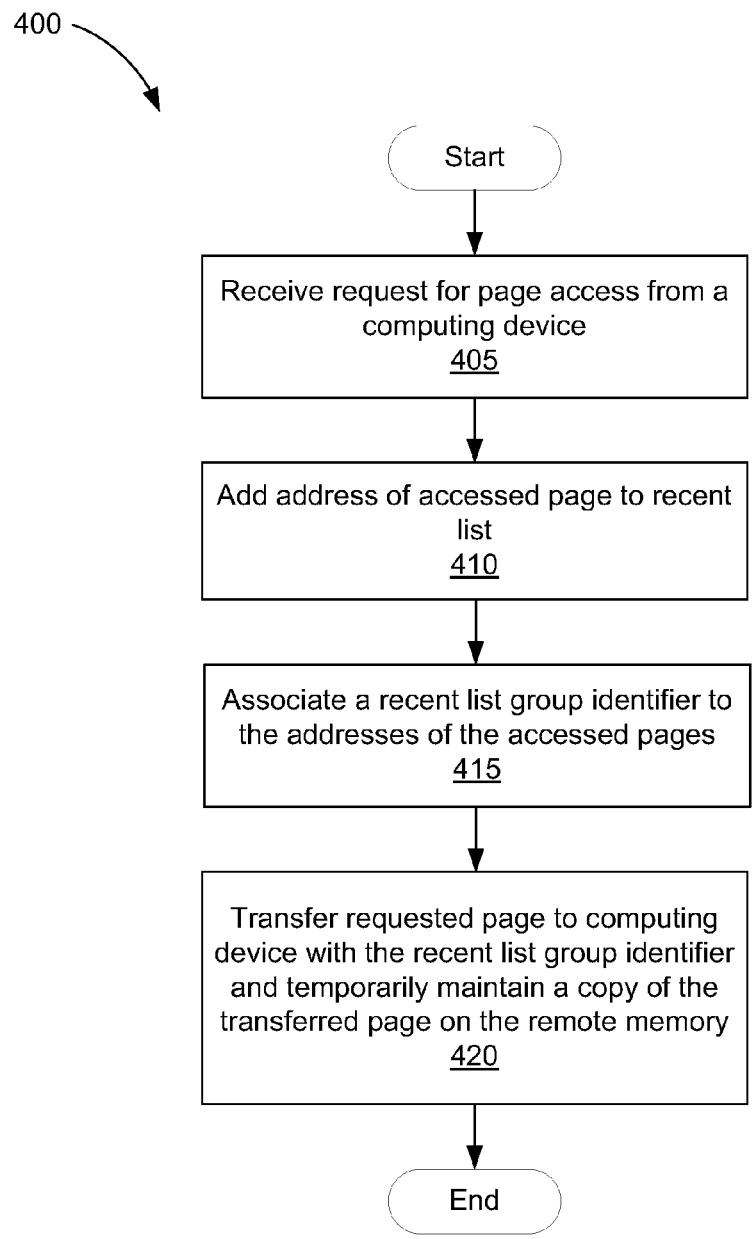
FIG. 4 is a flowchart showing a method of accessing remote memory on a memory blade according to one example of principles described herein.

FIG. 4 is a flowchart showing a method of accessing remote memory on a memory blade (115) according to one example of principles described herein. The method may begin with the remote memory on, for example, a memory blade (115) receiving (405) a request for access to a page located on the remote memory by the computing device. Upon receiving (405) this request, the address of the page that was requested is added (410) to the recent list memory (160). As described above, a recent list group identifier (305) is associated (415) with a number of addresses of the accessed pages.

In one example, the memory blade (115) may receive an evicted page from the local memory on the compute blade (105). If the local memory is full, space may be provided for the accessed page by evicting this page from the compute blade (105) to the memory blade (115).

The memory blade (115) may then transfer (420) the requested page to the compute blade (105) along with the recent list group identifier (FIG. 3, 305).

This page may be tracked by the compute blade (105) while the page exists as a page on local memory. Tracking of the page comprises determining if the page has been modified and where it has been modified. As discussed above, this information may be used later when the page is evicted from local memory.

Figure 5:
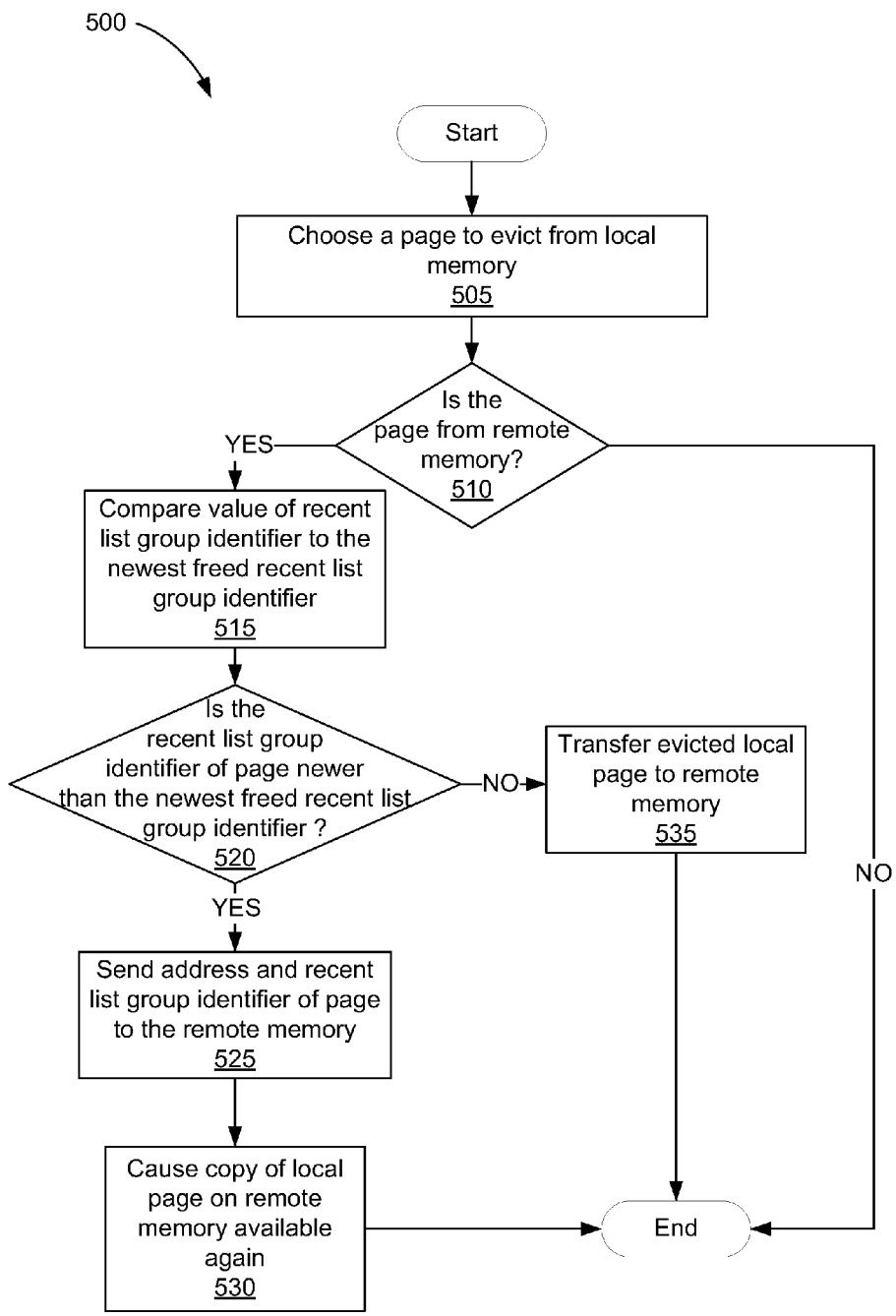
FIG. 5 is a flowchart showing a method of evicting local pages on a compute blade according to one example of principles described herein.

FIG. 5 shows this method (500) of evicting local pages on a compute blade according to one example of principles described herein. The method may begin with the compute blade (105) deciding which page to evict from the local memory (505). As described above, there are a number of decision policies that may be implemented such as a round robin policy, a least recently used replacement policy, or recently transferred page policy.

The compute blade (105) may then determine (510) if the page being evicted originated from remote memory. If the page being evicted did not originate from remote memory (Determination NO, 510) the process ends. If the page being evicted did originate from remote memory (Determination YES, 510), then the value of the recent list group identifier (305) is compared (515) with the newest freed recent list group identifier (310) associated with the most recent list of pages to be freed on the memory blade (115).

The compute blade (105) then determines (520) if the recent list group identifier (305) is newer than newest freed recent list group identifier (310). If the recent list group identifier (305) is not newer than the newest freed recent list group identifier (310) (Determination NO, 520), then the local page being evicted is transferred (535) to the remote memory on the memory blade (115). If the recent list group identifier (305) is newer than newest freed recent list group identifier (310) (Determination YES, 520), then the address and recent list group identifier (305) associated with that local page when the page was transferred to the compute blade (105) are sent (525) to the memory blade (115). The compute blade (105) then causes (530) the local page on the memory blade (115) to be made available again.

As described above, this method may also be optimized by using the tracking data described in connection with FIGS. 3 and 4 to modify the copy of the local page being evicted before it is released on the memory blade (115). Therefore, when the compute blade (105) causes (530) the copy of the local page on the remote memory to be made available again, the compute blade (105) may send a command to do so with the bit vector information described above included with the command. The memory blade (115) may then make the appropriate alterations to the copy and release it.

In one example, the methods described above may be accomplished by a computer program product comprising a computer readable storage medium having computer usable program code embodied therewith. The computer usable program code may comprise computer usable program code that, when executed by the processor, receives a request for access to a page from a compute blade (105); adds an address of the accessed page to a recent list memory (160) on the memory blade (115); associates a recent list group identifier (305) to a number of addresses of accessed pages; receives an evicted page from the local memory on the compute blade (105); and transfers the requested page to the compute blade (105) with the recent list group identifier (305). The computer usable program code may further comprise compute usable program code that, when executed by the processor, chooses a page to evict from local memory; determines if the page to be evicted originated from remote memory; compares the value of recent list group identifier (305) to the newest freed recent list group identifier (310) most recently broadcast by the memory blade; determines if the value of recent list group identifier (305) is newer than the newest freed recent list group identifier (310); sends the address and recent list group identifier (305) associated with the page to be evicted to the memory blade (115); and causes the local page being evicted and which is located on the memory blade (115) to be made available again.

The specification and figures describe a system and method of accessing remote memory on a memory blade. The present system and method allow for less overhead over a bus connection between a compute blade in a computing device and an associated memory blade. Therefore, the system and method allow for quicker eviction and transfer of pages of data over a bus which also reduce the amount of energy and time used to accomplish these tasks.

The preceding description has been presented to illustrate and describe examples of the principles described. This description is not intended to be exhaustive or to limit these principles to any precise form disclosed. Many modifications and variations are possible in light of the above teaching.

What is claimed is:
1. A computer program product comprising:
 a non-transitory computer readable storage medium having computer usable program code embodied therewith, the computer usable program code comprising:
  computer usable program code to, when executed by the processor, receive a request for access to a page from a computing device;
  computer usable program code to, when executed by the processor, add an address of the accessed page to a recent list memory on remote memory;
  computer usable program code to, when executed by the processor, associate a recent list group identifier to a number of addresses of accessed pages;
  computer usable program code to, when executed by the processor, receive an evicted page from the local memory on the computing device;
  computer usable program code that, when executed by the processor, transfer the requested page to the computing device with the recent list group identifier;
  computer, usable program code to, when executed by the processor, choose a page to evict from local memory;

computer, usable program code to, when executed by the processor, determine if the page to be evicted originated from remote memory;

computer usable program code to, when executed by the processor, compare the value of the recent list group identifier to a newest freed recent list group identifier on the remote memory;

computer, usable program code to, when executed by the processor, determine if the value of recent list group identifier is newer than the newest freed recent list group identifier;

computer, usable program code to, when executed by the processor, send the address and recent list group identifier associated with the page to be evicted to the remote memory; and computer, usable program code to, when executed b the processor, cause a copy of the local page being evicted and which is located on the remote memory to be freed.

2. The computer program product of claim 1, further comprising computer usable program code to, when executed by the processor, receive page modification metadata indicating which bits of data within the page being evicted had been changed while the page was on the computing device.

3. The computer program of claim 2, further comprising computer usable program code to, when executed by the processor, use the modification data to change the indicated portions of the page such that the changes made to the page while the page was on the computing device are reflected in the copy of the transferred page.

4. The computer program product of claim 2, in which the page modification metadata comprises encoded data comprising information regarding the changed blocks of data, concatenated consecutively, together with a bit vector having a length of ($page_{13}$ length)/($line_{13}$ length) equal to the number of lines per page.

5. The computer program product of claim 1, further comprising computer usable program code to, when executed by the processor, periodically copy changes to the transferred requested page while the transferred requested page is located on the computing device to the copy of the local page located on the remote memory.

* * * * *